(12) United States Patent
Fung

(10) Patent No.: US 7,091,455 B2
(45) Date of Patent: Aug. 15, 2006

(54) ELECTRIC THERMOS JUG

(76) Inventor: Shiu Po Fung, Flat C & D, 12/F., Phase 1, City Industrial Complex, 116-122 Kwok Shui Road, Tsuen Wan, New Territories, Hong Kong SAR (CN)

( * ) Notice: Subject to any disclaimer, the term of this patent is extended or adjusted under 35 U.S.C. 154(b) by 131 days.

(21) Appl. No.: 10/938,284

(22) Filed: Sep. 10, 2004

(65) Prior Publication Data

US 2005/0284861 A1 Dec. 29, 2005

(30) Foreign Application Priority Data

Jun. 25, 2004 (CN) .................. 2004 2 0074224

(51) Int. Cl.
*A47J 27/21* (2006.01)
*A47J 36/06* (2006.01)
*A47J 41/02* (2006.01)

(52) U.S. Cl. .............. 219/432; 279/429; 279/435; 279/436; 222/146.5

(58) Field of Classification Search .............. None
See application file for complete search history.

(56) References Cited

U.S. PATENT DOCUMENTS

| 2,546,983 | A | * | 4/1951 | Del Buttero | 219/436 |
| 2,759,091 | A | * | 8/1956 | Kolberg | 219/432 |
| 4,517,445 | A | * | 5/1985 | Tatsumi et al. | 392/444 |
| 4,812,623 | A | * | 3/1989 | Haden et al. | 219/437 |
| 6,943,323 | B1 | * | 9/2005 | Iannucci | 219/438 |

FOREIGN PATENT DOCUMENTS

| GB | 2369553 A | * | 6/2002 |
| GB | 2397214 A | * | 7/2004 |

* cited by examiner

*Primary Examiner*—Joseph Pelham
(74) *Attorney, Agent, or Firm*—Alix, Yale & Ristas, LLP

(57) ABSTRACT

An electric thermos jug comprises generally from the top to the bottom a lid assembly, a spout assembly, a double-layer vacuum body, a heating element, an underbody, and a base. An insulating plate and an insulating material layer are provided under the heating element inside the underbody of the jug. The lid is two-layer structure comprising an upper lid and lower lid with an air plenum in between. The electric thermos is convenient for use and effective in heat insulation due to the excellent air tightness of the components. The temperature inside the jug can be maintained for a long time without the need of repetitive heating. As a result, it can maintain a good water quality and is energy efficient. A safety valve is also employed.

8 Claims, 3 Drawing Sheets

ELECTRIC THERMOS JUG

FIELD OF THE INVENTION

The present invention relates to a thermos jug, and especially relates to a jug that can boil water by electric heating and maintain the hot water temperature.

BACKGROUND OF THE INVENTION

At present, people usually boil water using an electric kettle, and then pour the boiled water into a thermos bottle for insulated storage, which results in inconvenient handling. Consequently, a kind of electric thermos jug was invented that could boil water and preserve heat. It worked using two heating elements, namely, a main heating element with large power and a heating element with low power for keeping water hot by intermittent heating. This structure could maintain water temperature within the preset range for a long time, but it was not provided with heat insulation measures. Therefore, water in the jug had to be boiled frequently and repeatedly, which not only had a bad influence on water quality, but also wasted electricity.

As a result, an electric thermos jug with single heating element was invented, which body was covered with heat insulating material, or, had a double-layer with vacuum gap. It increased greatly thermal insulation and reduced heating frequency. Still, its bottom for heating had good thermal conduction. Consequently there was a swift heat loss from the bottom. Besides, the lid was designed as single-layer structure, and for safety reasons the lid was usually provided with a steam discharge vent, or steam discharged directly from the spout to prevent explosion due to excessive steam pressure in the jug when boiling water. As a result, this structure caused heat loss from the lid or spout during the insulated storage period.

SUMMARY OF THE INVENTION

An objective of the present invention is to solve the above problems and provide a new and improved electric thermos jug with effective thermal insulation and long heat preservation characteristics.

An objective of the present invention can be realized in the way mentioned below.

One embodiment of the invention is an electric thermos jug comprising, generally from the top to the bottom, a lid assembly, a spout assembly, a double-layer vacuum body, a heating element, an underbody, and a base characterized by the insulating plate and insulating material layer being provided under said heating element inside the jug bottom. The lid assembly is a two-layer structure that comprises an upper lid and a lower lid with an air layer in between. The lower lid of the lid assembly is fitted with a relief valve and air vent for pressure relief.

The present invention is convenient for use and effective in heat insulation. Due to excellent air tightness of all components, the jug is in sealed conditions during the thermal insulation stage. In addition, the body and the lid use a two-layer structure, and the underbody is adapted for heat insulation. Therefore, the temperature inside the jug will be maintained for a long time without the need of repetitive heating. As a result, it can maintain good water quality and is energy efficient. Moreover, its safety performance increases greatly because it employs a safety valve.

DETAILED DESCRIPTION OF THE PREFERRED EMBODIMENT

Figure 1:
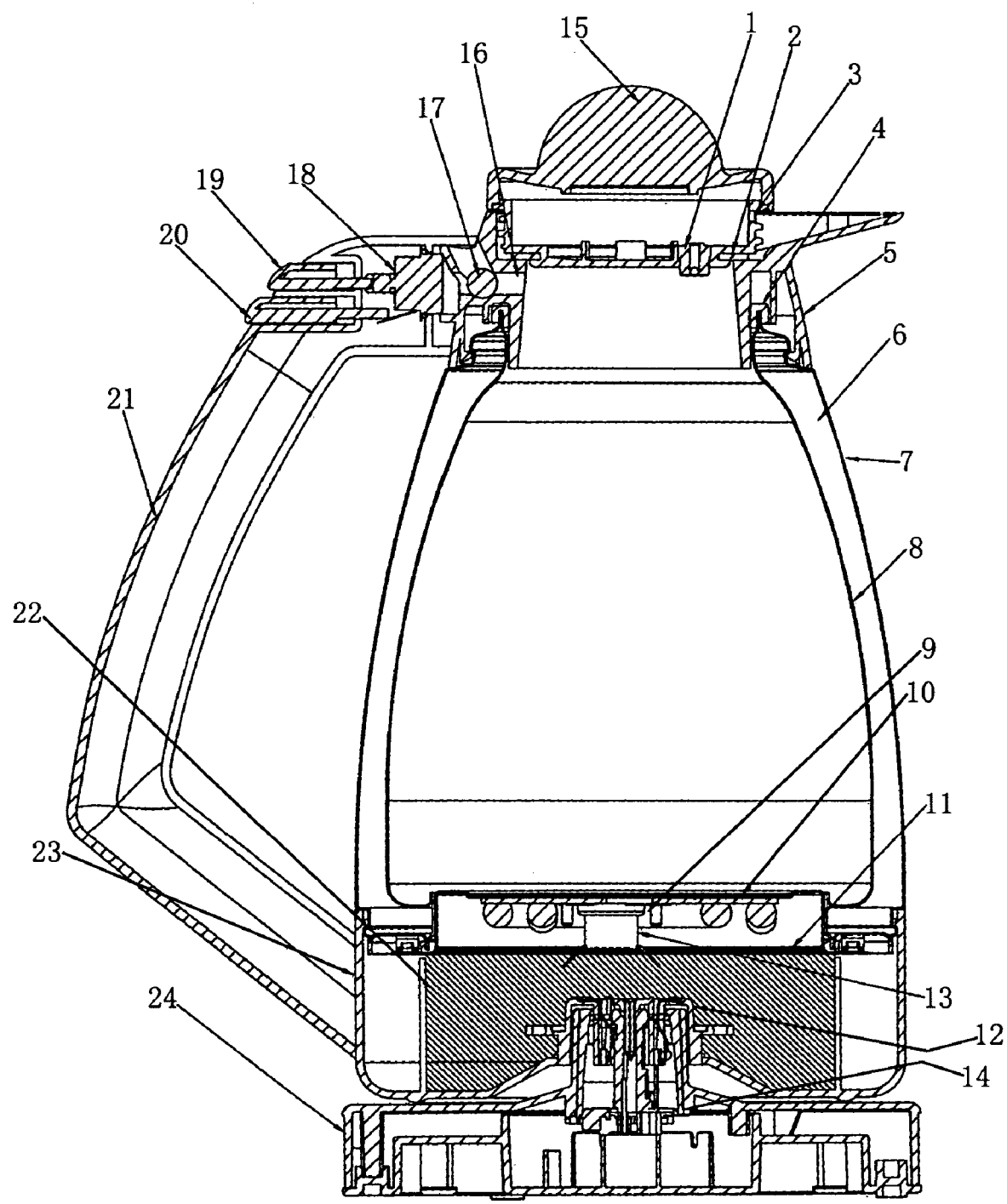
FIG. 1 is sectional view of a preferred embodiment of an electric thermos jug of the present invention.

As shown in FIG. 1, an electric thermos jug in accordance with the invention comprises generally from the top to the bottom a lid assembly, a spout assembly 5, a body 6, a heating element 10, an underbody 23, and a base 24.

Figure 2:
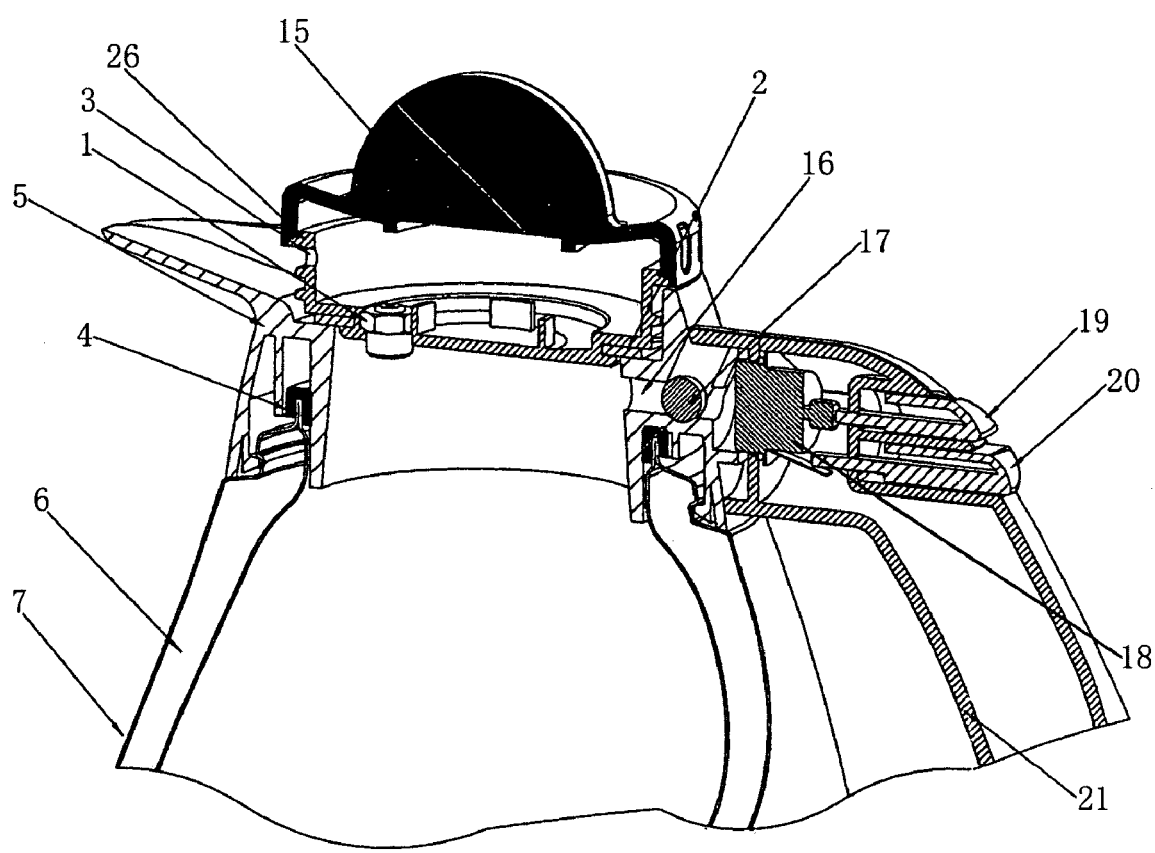
FIG. 2 is enlarged view of a three-dimensioned section plane of an upper portion of the electric thermos jug of FIG. 1.
Figure 3:
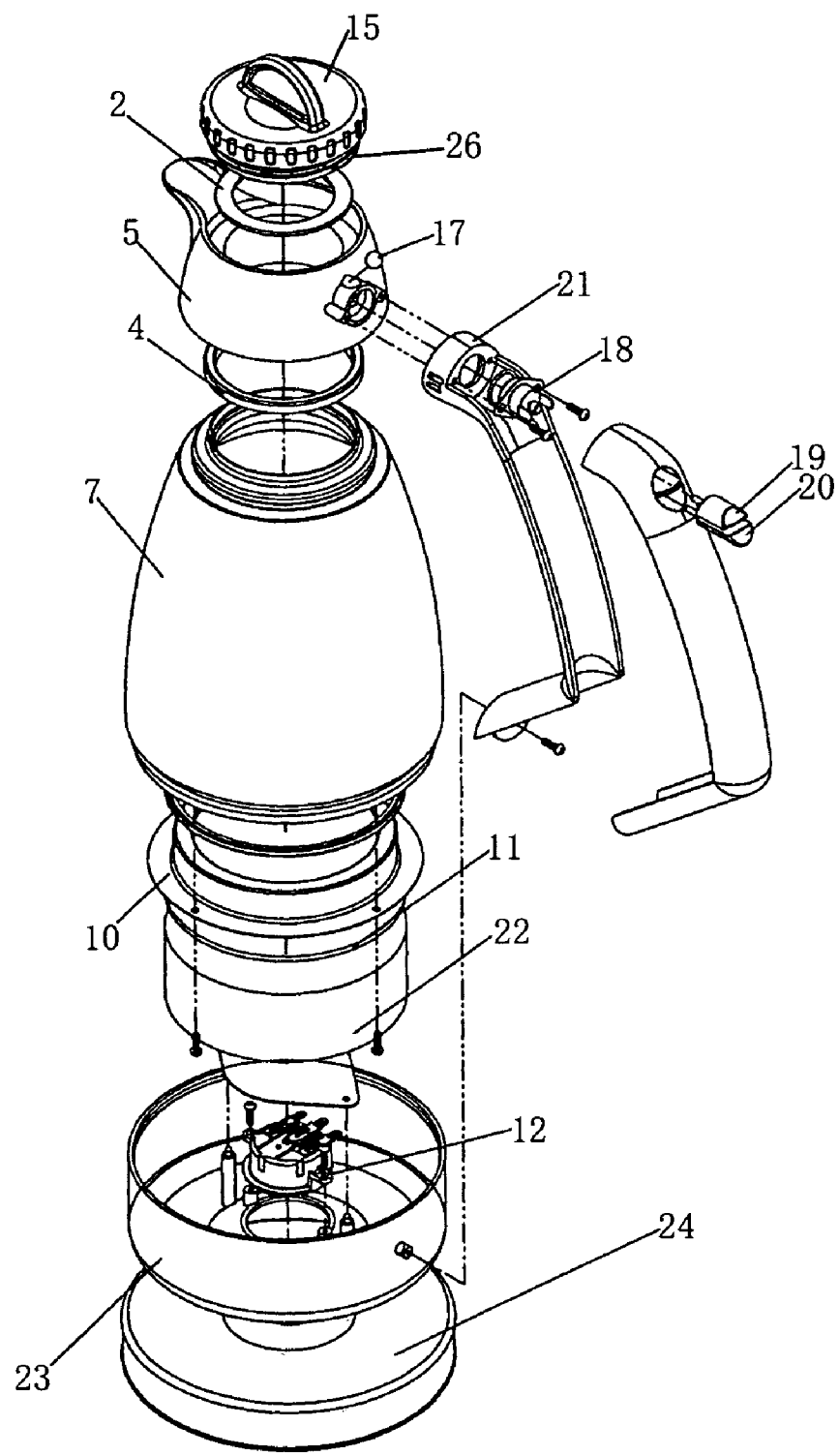
FIG. 3 is an exploded perspective view showing structural components of the electric thermos jug of FIG. 1.

As shown in FIG. 1, FIG. 2 and FIG. 3, the lid assembly is two-layer structure that comprises an upper lid 15 and lower lid 26 with an air layer plenum in between. A seal ring 2 is fitted under the lower surface of lower lid 26 in a corresponding position to the spout assembly 5, which has sealing function upon screwing. There are external threads outside lower lid 26 for screwing engagement with the spout assembly 5. When they are tightly screwed together, at the water outlet of the spout assembly 5 there is a corresponding air vent 3, which connects the air layer plenum with the environment. A relief valve 1 is mounted at the bottom side of lower lid 26, which connects the air layer plenum to the inside of the jug. If the internal steam pressure is too high, it will be relieved through the relief valve 1 and the air vent 3. In this way the safety feature can be greatly increased while the sealing condition is ensured.

The spout assembly 5 is clamped and mounted above the jug body 6, and the joint gap is sealed using seal ring 4. Handle 21 is installed on the outside of spout assembly 5, and in their joint, steam path 16, steam valve 17, and steam pressure sensor 18 that control the on-off of the power supply are fitted. Power "On" and "Off" buttons 19 and 20 are fitted in the handle 21, and connect with a steam pressure sensor 18, respectively.

Jug body 6 comprises a housing 7 and an internal container 8, which form a double-layer stainless steel vacuum body. Its bottom is fixed with the underbody 23 of the jug. The bottom of the jug-body is the heating area with a single-layer structure. Heating element 10 is placed under this heating area in close contact, which produces good heat transfer and reduces thermal losses. Heating element 10 connects with a fuse 9 and a thermostat 13 which functions as a protector to prevent drying-out. In the underbody 23, there are an insulating plate 11 and an insulating material layer 22 under the heating element 10. A cordless socket 12 is in the middle of the floor of the underbody 23, while a cordless plug 14 is in the middle of base 24, which mates with the cordless socket 12 in the underbody 23.

For usage, the jug is filled with water and the jug lid is screwed for closure. The jug is placed on base 24, to connect cordless socket 12 with plug 14. "On" button 19 is pressed down to switch on the power and therefore heating element 10 is energized. When water is boiled, steam goes through steam path 16 and steam valve 17, and acts on steam pressure sensor 18. When the steam pressure reaches the set value of sensor 18, power supply will be automatically shut down to stop heating. In this way, the water-boiling time can be controlled through the regulation of the sensing value of sensor 18.

During the thermal insulation state when water is boiled and power is switched off to stop heating, due to the sealing-type design of the jug and the heat insulation features, water in the jug can be maintained at a high temperature for a long time without the need of repetitive heating. For pouring the boiled water, the jug lid is unscrewed and turned to a certain angle to make the outlet of the jug lid align with the spout. Water can then be poured out. After pouring water, the jug lid is screwed on, and the jug is maintained in sealing state again.

What is claimed:

1. An electric thermos jug comprising:
 a base;
 a jug body mountable on said base and having an underbody at a lower position, a double-layer vacuum body, a spout assembly at an upper portion, a heating element, and an insulating plate and an insulating material disposed under said heating element inside said underbody; and
 a lid assembly removably mountable to an upper portion of said jug body comprising an upper lid and a lower lid defining an intermediate air plenum.

2. The electric thermos jug as described in claim 1 wherein said lower lid of said lid assembly is fitted with a relief valve and an air vent for pressure relief.

3. The electric thermos jug as described in claim 1 wherein a seal ring is fitted under a lower surface of said lower lid of said lid assembly at a corresponding position of said spout assembly.

4. The electric thermos jug as described in claim 1 wherein a steam valve and a steam pressure sensor that control on-off of power supply are fitted at a side location of said spout assembly.

5. The electric thermos jug as described in claim 1 wherein the jug body comprises a housing and an internal container which form a double-layer stainless steel vacuum body.

6. The electric thermos jug as described in claim 1 wherein a middle of a bottom of said double-layer body defines a heating area with a single-layer structure, and the heating element is located under this heating area and in close contact thereof.

7. The electric thermos jug as described in claim 1 wherein said heating element connects with a thermostat.

8. The electric thermos jug as described in claim 1 and further comprising a matchable cordless socket and a cordless plug fitted in a floor of the underbody and in the base, respectively.

* * * * *